US012228092B2

(12) United States Patent
Johnson et al.

(10) Patent No.: US 12,228,092 B2
(45) Date of Patent: Feb. 18, 2025

(54) CYLINDER HEAD FOR A LEAN-BURN GASOLINE ENGINE

(71) Applicant: JAGUAR LAND ROVER LIMITED, Warwickshire (GB)

(72) Inventors: Jack Johnson, Coventry (GB); Lyn McWilliam, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/551,620

(22) PCT Filed: Mar. 26, 2021

(86) PCT No.: PCT/EP2021/057915

§ 371 (c)(1),
(2) Date: Sep. 21, 2023

(87) PCT Pub. No.: WO2022/199832

PCT Pub. Date: Sep. 29, 2022

(65) Prior Publication Data

US 2024/0175406 A1 May 30, 2024

(51) Int. Cl.
*F02F 1/42* (2006.01)
*F02F 1/24* (2006.01)

(52) U.S. Cl.
CPC .......... *F02F 1/4235* (2013.01); *F02F 1/4214* (2013.01); *F02F 2001/246* (2013.01); *F02F 2200/06* (2013.01)

(58) Field of Classification Search
CPC .. F02F 1/4235; F02F 1/4214; F02F 2001/246; F02F 2200/06
See application file for complete search history.

(56) References Cited

U.S. PATENT DOCUMENTS 5,195,488 A * 3/1993 Rattigan ................. F02B 31/00 123/308
5,634,444 A * 6/1997 Matsuki ................ F02F 1/4214 123/188.14

(Continued)

FOREIGN PATENT DOCUMENTS

GB 2242226 A 9/1991

OTHER PUBLICATIONS

International Search Report and Written Opinion of the International Searching Authority for International application No. PCT/EP2021/057915 dated Dec. 22, 2021.

*Primary Examiner* — Sizo B Vilakazi
(74) *Attorney, Agent, or Firm* — Carlson, Gaskey & Olds, P.C.

(57) ABSTRACT

A lean-burn gasoline engine (110), comprising an air intake port having an air intake port inlet, an air intake port outlet, and an air channel (45) connecting the air intake port inlet to the air intake port outlet, a combustion chamber (50) having a combustion chamber inlet being connected to the air intake port outlet, the combustion chamber inlet having a throat where the air intake port outlet meets the combustion chamber inlet, a movable valve (51) comprising a valve head top surface (62) that faces the air intake port and a valve stem (63), the movable valve (51) being arranged to move between a closed state for closing off the combustion chamber inlet and an opened state wherein intake air can flow from the air intake port into the combustion chamber (50), a valve guide opening (69) in a wall of the air channel opposite the top surface (62) of the movable valve (51), and a valve guide passage (66) extending into the wall and away from the valve guide opening (69), the valve guide passage (66) housing a valve guide (65) arranged to guide the valve stem (63) and permit movement of the movable valve (51) between the closed state and an opened state. The valve (Continued)

guide (65) has a first end proximate the movable valve being positioned within the valve guide passage (66) such that airflow through the air channel (45) is not impeded by the valve guide (65).

19 Claims, 8 Drawing Sheets

(56) References Cited

U.S. PATENT DOCUMENTS

| | | | | | |
|---|---|---|---|---|---|
| 5,836,284 | A * | 11/1998 | Oda | F02B 17/005 123/188.14 |
| 5,913,554 | A * | 6/1999 | Oda | F02F 1/4214 123/188.14 |
| 9,797,336 | B2 * | 10/2017 | Nakahara | F02B 31/085 |
| 2019/0323420 | A1 * | 10/2019 | Hotta | F02B 31/04 |
| 2020/0011266 | A1 * | 1/2020 | Song | B22D 25/02 |

* cited by examiner

CYLINDER HEAD FOR A LEAN-BURN GASOLINE ENGINE

TECHNICAL FIELD

The present disclosure relates to a cylinder head for a lean-burn gasoline engine, to a lean-burn gasoline engine, to a vehicle with such an engine, and to a manufacturing method.

BACKGROUND

In classic internal combustion engines, gasoline burns best when it is mixed with air in the proportions of 14.7:1 (lambda=1). Most modern gasoline engines used in vehicles tend to operate at or near this so-called stoichiometric point for most of the time. Ideally, when burning fuel in an engine, only carbon dioxide ($CO_2$) and water ($H_2O$) are produced. In practice, the exhaust gas of an internal combustion engine also comprises significant amounts of carbon monoxide (CO), nitrogen oxides ($NO_x$) and unburned hydrocarbons.

One possible route for increasing fuel efficiency is to burn the fuel with an excess of air. Burning fuel in such an oxygen-rich environment is usually called lean-burning. Typical lean-burn engines may mix air and fuel in proportions of, for example, 20:1 (lambda>1.3) or even 30:1 (lambda>2).

Advantages of lean-burn engines include, for example, that they produce lower levels of $CO_2$ and hydrocarbon emissions by better combustion control and more complete fuel burning inside the engine cylinders. The engines designed for lean burning can employ higher compression ratios and thus provide better performance, more efficient fuel use and lower exhaust hydrocarbon emissions than conventional gasoline engines. Additionally, lean-burn modes help to reduce throttling losses, which originate from the extra work that is required for pumping air through a partially closed throttle. When using more air to burn the fuel, the throttle can be kept more open when the demand for engine power is reduced.

Lean burning of fuel does, however, also come with some technical challenges that have to be overcome for providing an engine that is suitable and optimised for efficiently burning hydrocarbons in an oxygen-rich environment. For example, if the mixture is too lean, the engine may fail to combust. Especially at low loads and engine speeds, reduced flammability may affect the stability of the combustion process and introduce problems with engine knock. Further, a lower fuel concentration leads to less output. Because of such disadvantages, lean burn is currently only used for part of the engine map and most lean-burning modern engines, for example, tend to cruise and coast at or near the stoichiometric point.

In order to enable the lean burning of fuel over a larger portion of the engine map, the engine needs to be designed in such a way to enable a large airflow into the combustion chamber and to ensure a reliable combustion process that will effectively burn all fuel, despite the oxygen rich conditions.

It is an aim of the present invention to provide an improved lean-burn gasoline engine.

SUMMARY OF THE INVENTION

Aspects and embodiments of the invention provide a cylinder head for an engine, an engine, and a vehicle with such an engine. The engine may be suitable for use with fuels including gasoline, diesel, hydrogen, LPG or any other suitable combustible fuel. The engine may be a lean-burn engine.

Preferably, aspects and embodiments of the invention provide a cylinder head for a lean-burn gasoline engine, a lean-burn gasoline engine and a vehicle with such an engine.

According to an aspect of the present invention there is provided a lean-burn gasoline engine comprising:

- an air intake port having an air intake port inlet, an air intake port outlet, and an air channel connecting the air intake port inlet to the air intake port outlet;
- a combustion chamber having a combustion chamber inlet being connected to the air intake port outlet, the combustion chamber inlet having a throat where the air intake port outlet meets the combustion chamber inlet;
- a movable valve, or air inlet valve, comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber;
- a valve guide opening in a wall of the air channel opposite the top surface of the movable valve; and
- a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide.

In this way, by positioning the valve guide such that airflow through the air channel is not impeded by the valve guide, a problem that the valve guide can disrupt air intake through the air intake port can be avoided, or at least ameliorated. The valve guide may for example be positioned such that it extends to or proximate the opening in the wall of the air channel, but does not protrude (or at least does not substantially protrude) into the air channel.

Preferably, at least part of the first end of the valve guide is within less than approximately 5 mm of the opening in the wall of the air channel. More preferably, at least part of the first end of the valve guide is within less than approximately 1 mm of the opening in the wall of the air channel.

In some embodiments, at least part of the first end of the valve guide is substantially flush with the wall of the air channel. In this case, optionally the first end of the valve guide is substantially flush with the wall of the air channel at all edges of the opening.

The opening may comprise a first edge distal from the air intake port outlet and a second edge proximal to the air intake port outlet.

The air channel may comprise an upper wall having a substantially straight portion which transitions to a curved portion, the curved portion curving towards the combustion chamber, wherein the opening in the wall is provided in the upper wall at or near the transition. In this case, the first edge of the opening may be on the substantially straight portion of the upper wall. The second edge of the opening may be at or near the transition. Alternatively, the second edge of the opening may be on the substantially straight portion of the upper wall. With these geometries, airflow passing the first edge will generally pass by the second edge too, rather than striking an internal surface of the valve guide channel adjacent the second edge.

The valve guide passage may have a substantially uniform diameter about its central axis inwardly of the passage from the first edge.

The walls of the passage about the valve guide may continue in the same direction beyond the valve guide to the edges of the opening.

The valve guide may extend closer to the air channel at the first edge of the opening than at the second edge of the opening.

The opening may be elliptical, and have a major axis $O_d$ of:

$$O_d \approx O_p/\text{Sin } \alpha,$$

where $O_p$ is the diameter of the valve guide passage and a is the angle of the passage with respect to the wall of the air channel.

A volume V of free space defined between the opening, the interior walls of the passage, and the valve guide may be less than or equal to $1e^{-6}$ $m^3$, and is preferably less than $5e^{-7}$ $m^3$, and still more preferably less than or equal to $3.7e^{-7}$ $m^3$. These volumes are small enough so as not to significantly disrupt airflow past the entrance to the valve guide passage.

The first edge of the opening may define a sharp transition, at a first angle, between the wall of the air channel within which the opening is provided, and a wall of the valve guide passage. The valve guide passage may be inclined at a second angle with respect to the air channel, wherein the first angle and the second angle are substantially the same.

The first edge may have a radius of curvature of between zero and 3 mm, and preferably between zero and 1 mm.

The first angle may be acute. The first angle may for example be less than 60°, greater than 15°, and more preferably between 20° and 30°.

According to another aspect of the invention, there is provided a vehicle comprising a lean-burn gasoline engine according to the above.

According to another aspect of the invention, there is provided a cylinder head for a lean-burn gasoline engine, the cylinder head comprising:

an air intake port having an air intake port inlet, an air intake port outlet, and an air channel connecting the air intake port inlet to the air intake port outlet, the ain intake port outlet being connectable to a combustion chamber of a lean-burn gasoline engine having a combustion chamber inlet being connected to the air intake port outlet, the combustion chamber inlet having a throat where the air intake port outlet meets the combustion chamber inlet;

the cylinder head being configured to receive a movable valve comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber;

a valve guide opening in a wall of the air channel opposite the top surface of the movable valve; and a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide.

According to another aspect of the present invention, there is provided a method of manufacturing a (preferably) lean-burn gasoline engine, the engine comprising an air intake port having an air intake port inlet, an air intake port outlet, and an air channel connecting the air intake port inlet to the air intake port outlet, and a combustion chamber having a combustion chamber inlet being connected to the air intake port outlet, the combustion chamber inlet having a throat where the air intake port outlet meets the combustion chamber inlet, a movable valve comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber, a valve guide opening in a wall of the air channel opposite the top surface of the movable valve, and a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide, the method comprising:

providing a cast part;

cutting through the wall of the air channel, to form the valve guide opening and the valve guide passage.

Two main implementations are envisaged. In the first implementation, the cutting step comprises a first cutting step carried out from a side of the cast part away from the air channel and cutting towards the air channel, the first cutting step forming a first cut of the valve guide passage, followed by a second cutting step carried out through the throat and the air channel and into the first cut, which forms a second cut of the valve guide passage. In this case, the first and second cuts are carried out from and in opposite directions, but along substantially the same axis. A region of the cast part into which the cutting tool is to initially cut may be configured to be generally perpendicular to the direction of cut to reduce the likelihood of the cutting tool sliding from a desired cutting axis. The first cut therefore provides the valve guide passage in the correct place, whereas the second cut finishes the passage cleanly, and ensures accurate alignment with the throat of the air intake port (which is cut in the same step, or with a tool coaxially aligned with the tool used to cut the valve guide passage.

In a second implementation, a portion of the wall of the air channel at which the opening is to be formed is provided with a cast formation which extends into the air channel, the formation having a target surface substantially or generally perpendicular to an intended orientation of the valve guide passage starting at the target surface. In this case, the cutting step comprises a first cutting step, starting at the target surface, cutting away the formation, and forming the valve guide passage. It will be appreciated that the first cutting step in the second implementation is carried out in the opposite direction to the first cutting step in the first implementation. In the second implementation, the cutting step comprises a second cutting step, carried out through the throat and the air channel and into the first cut made by the first cutting step, which forms a second cut of the valve guide passage. It will be appreciated that the second cutting step is substantially the same for both implementations.

Also commonly to both implementations, the method may further comprise:

inserting the valve guide into the valve guide passage; and machining the valve guide to form or enlarge a bore through the valve guide while the valve guide is disposed within the valve guide passage. It will be appreciated that, in the case of the bore being formed by this step, the valve guide may be inserted as a solid cylinder, whereas in the case of the bore being enlarged by this step, the valve guide may be inserted as a cylinder having a central bore extending part or entirely through it. In either case, the result of the machining step will be a bore which is dimensioned to receive the valve stem, and oriented such that the valve accurately aligns with the valve seat.

It will be appreciated that the cutting steps may be carried out at an angle with respect to the upper wall of the air passage which achieves the desired sharp transition of the first edge, while the insertion step may be carried out such as to achieve the desired positioning of the valve guide. In each case achieving the desired airflow properties with respect to the valve guide passage.

According to another aspect, there is provided an engine comprising:

an air intake port having an air intake port inlet, an air intake port outlet, and an air channel connecting the air intake port inlet to the air intake port outlet;

a combustion chamber having a combustion chamber inlet being connected to the air intake port outlet, the combustion chamber inlet having a throat where the air intake port outlet meets the combustion chamber inlet;

a movable valve comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber;

a valve guide opening in a wall of the air channel opposite the top surface of the movable valve; and a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide.

BRIEF DESCRIPTION OF THE DRAWINGS

One or more embodiments of the invention will now be described, by way of example only, with reference to the accompanying drawings, in which.

DETAILED DESCRIPTION

Figure 1:
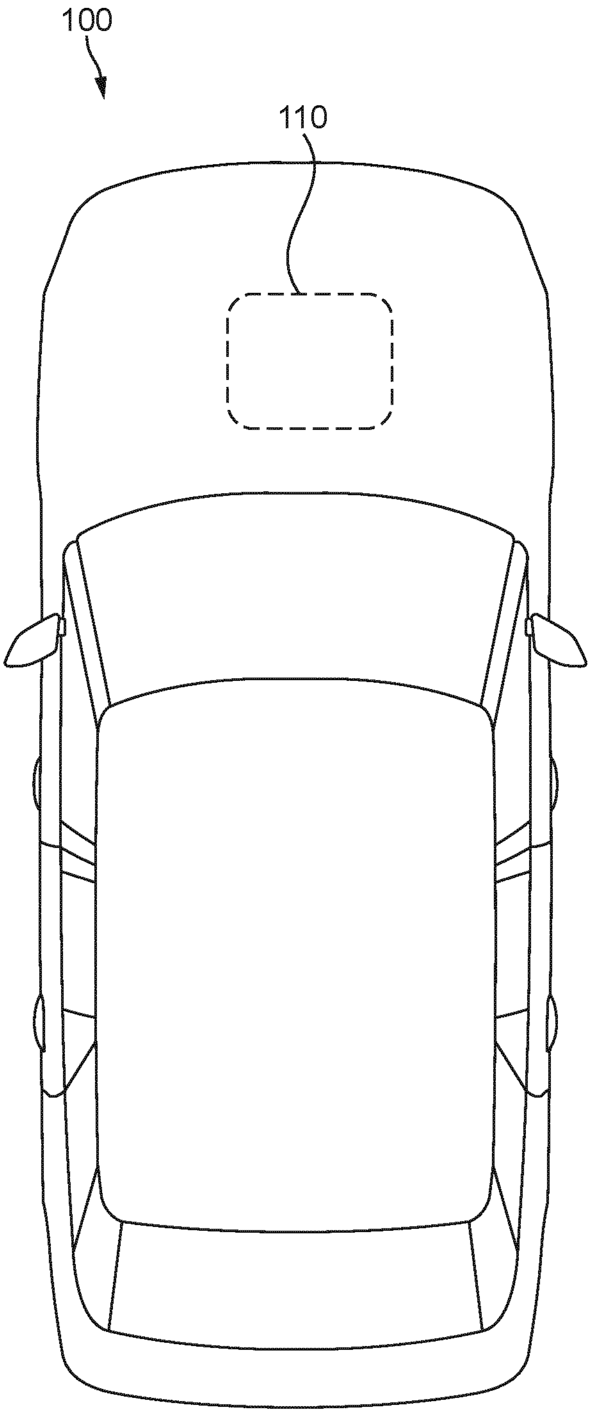
FIG. 1 shows a vehicle in which the invention may be used.

FIG. 1 shows a vehicle 100 in which the invention may be used. In this example, the vehicle 100 is a car, but the invention is equally applicable to other vehicles driven by a lean-burn gasoline engine 110. In this vehicle 100, the lean-burn gasoline engine 110 is positioned in the front and coupled to a drivetrain to drive the front and/or rear wheels of the vehicle 100. The energy needed for driving the vehicle 100 is provided by burning fuel in the engine's cylinders and let the cylinder pistons drive a crankshaft that is mechanically connected to the vehicle's drivetrain.

Compared to classic internal combustion engines, the lean-burn engine 110 of this vehicle 100 burns the fuel with an excess of air in the air-fuel mixture. Typical lean-burn engines may mix air and fuel in proportions of, for example, 20:1 (lambda>1.3) or even 30:1 (lambda>2). Advantages of lean-burn engines include more efficient fuel use and lower exhaust hydrocarbon emissions than conventional gasoline engines.

In order to enable the lean burning of fuel over a large portion of the engine map, the engine 110 is designed in such a way to enable a large air flow into the combustion chamber and a good mixing with the relatively small amount of fuel that is to be burnt to ensure a reliable combustion process that will effectively burn all fuel, despite the oxygen rich conditions.

Figure 2:
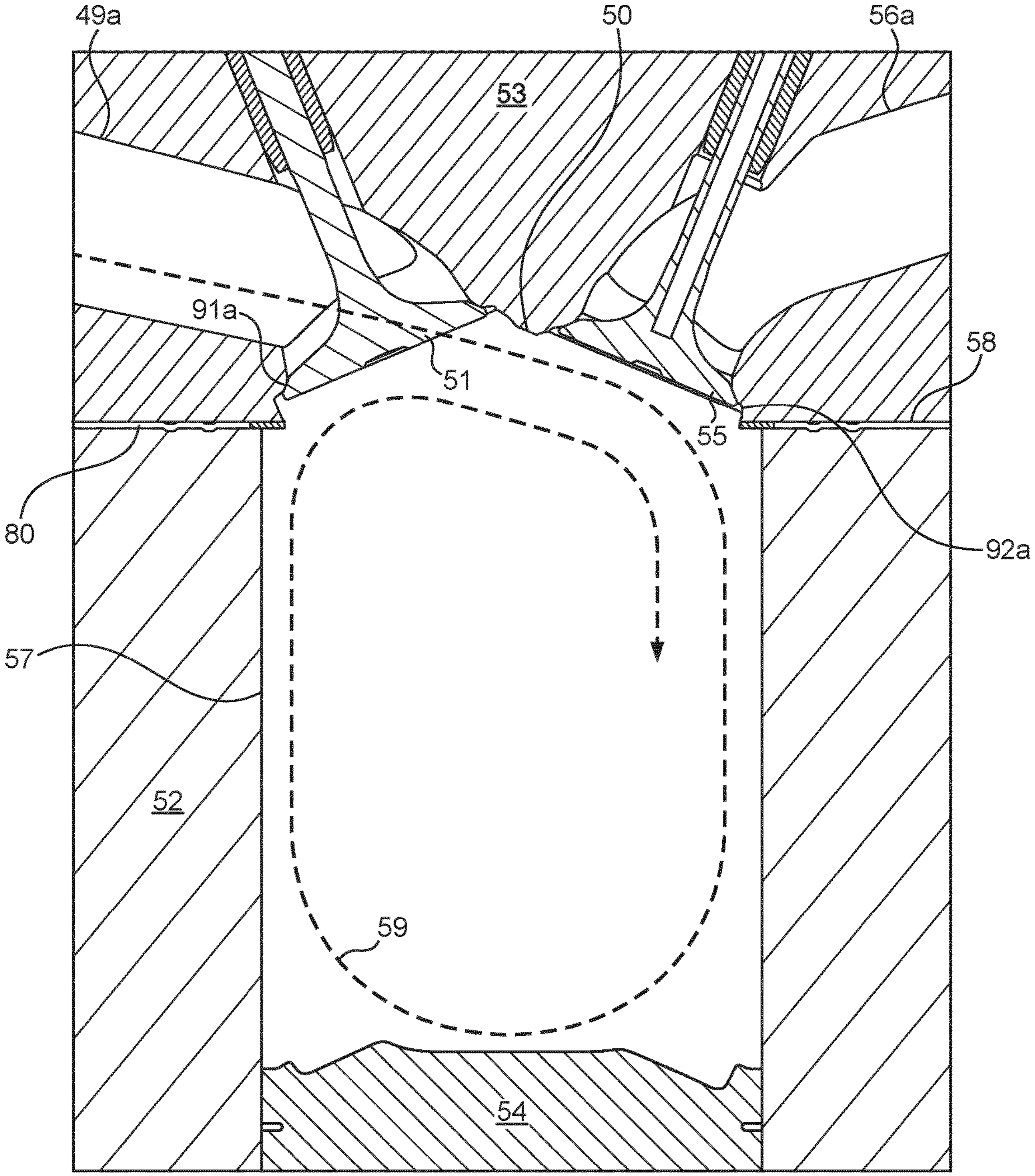
FIG. 2 shows a cross section of portion of an engine block and cylinder head with a piston shown at bottom dead centre.

FIG. 2 shows a cross section of a portion of an engine block 52 and a cylinder head 53. The engine block 52 comprises a cylinder 57 which houses a piston 54 shown at bottom dead centre (BDC) in FIG. 2. The cylinder head 53 comprises a combustion chamber 50 which extends into the cylinder head 53 away from a gasket interface surface 58. A head gasket 80 is located between the engine block 52 and cylinder head 53.

Figure 3:
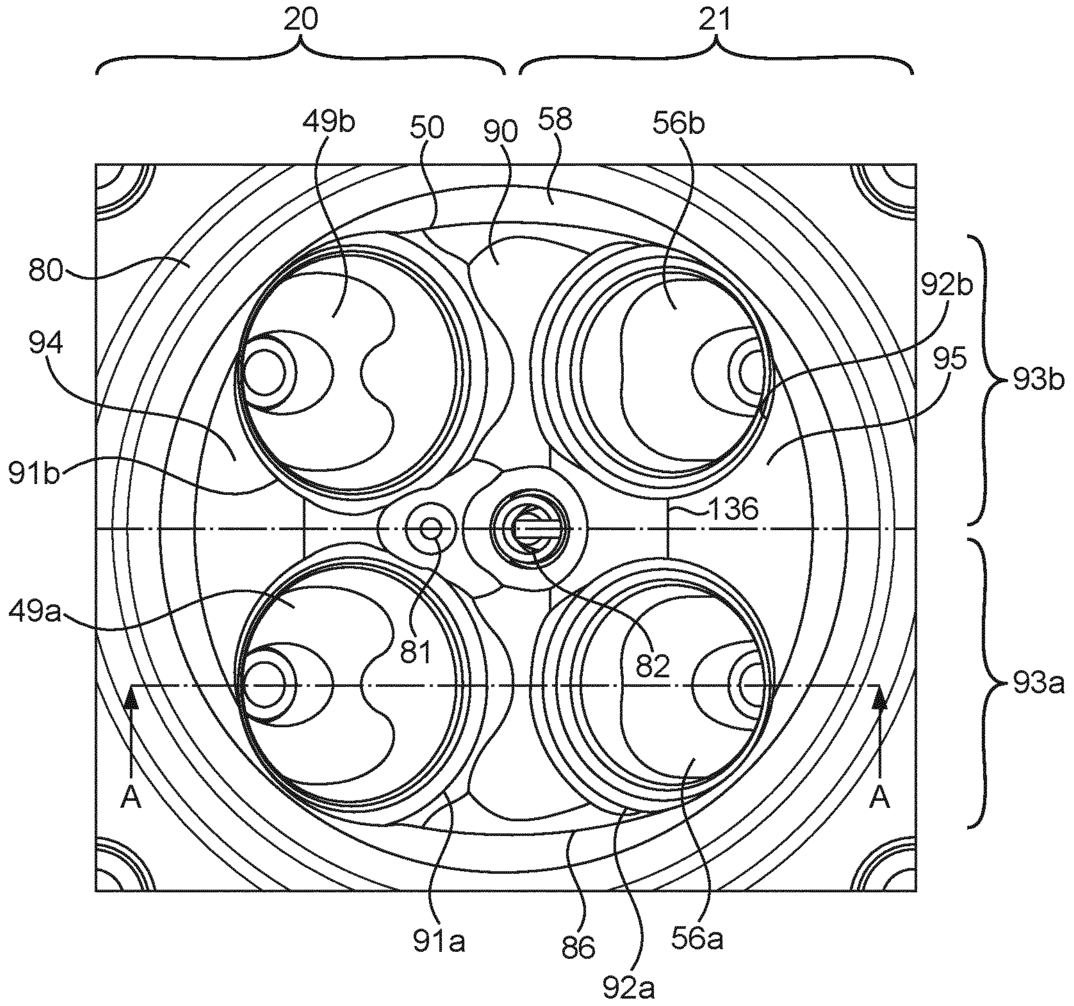
FIG. 3 shows a plan view of the roof surface of the combustion chamber of FIG. 2.

Referring additionally to FIG. 3, a pair of air inlets 49*a*, 49*b* provide a path for a flow of air to the combustion chamber 50 in use, and a pair of exhaust outlets 56*a*, 56*b* provide an exhaust path for the combustion products exiting the combustion chamber 50 in use. The air inlets 49*a*, 49*b* connect to respective air inlet openings 91*a*, 91*b* located in the roof surface 90 of the combustion chamber 50, and the exhaust outlets 56*a*, 56*b* connect to respective exhaust outlet openings 92*a*, 92*b* located in the roof surface 90 of the combustion chamber 50. The first air inlet opening 91*a* and the first exhaust outlet opening 92*a* are located on a first side 93*a* of the combustion chamber 50, and the second air inlet opening 91*b* and the second exhaust outlet opening 92*b* are located on a second side 93*b* of the combustion chamber 50. The cross section of FIG. 2 is taken along section A-A which passes through the first air inlet opening 91*a* and the first exhaust outlet opening 92*a* on the first side 93*a* of the combustion chamber 50.

Referring once again to FIG. 2, an inlet valve 51 controls the opening and closing of the first air inlet opening 91*a*, and an exhaust valve 55 controls the opening and closing of the first exhaust outlet opening 92*a*. An equivalent inlet valve (not shown) controls the opening and closing of the second air inlet opening 91*b*, and an equivalent exhaust valve (not shown) controls the opening and closing of the second exhaust outlet opening 92*b*. The inlet valve 51 and the exhaust valve 55 are shown in the closed position in FIG. 2.

A dotted line provides a simplified 2D representation of the preferred air flow path 59 into and through the combustion chamber 50 and cylinder 57 during the intake stroke. As noted above, the inlet valve 51 is shown in the closed position in FIG. 2. The air flow path 59 is not possible with the inlet valve 51 in the closed position as shown. Nonetheless, the preferred air flow path 59 is shown for the purpose of illustration.

With the valve 51 and air inlet design of this embodiment, it is possible to create a tumble motion of the incoming air, first along the roof 90 of the combustion chamber 50 towards the opposite wall of the cylinder 57, under the outlet valves 55 that close off the exhaust outlet openings 92*a*, 92*b*, and then down along that opposite wall of the cylinder 57, back over the top surface of the piston 54 and up along the other wall of the cylinder 57 in the direction of the inlet valves 51 again. This tumble is preferably kept in motion during the full intake stroke and at least a portion of the compression stroke of the piston 54 moving through the cylinder 57. The thus produced tumble helps to obtain an optimal distribution of air and fuel inside the cylinder 57 and combustion chamber 50 that can then break down in the latter stages of the compression stroke into turbulence to facilitate the subsequent combustion process.

The combustion chamber roof surface 90 extends into the cylinder head 53 away from the gasket interface surface 58. The intersection between the combustion chamber roof surface 90 and the gasket interface surface 58 comprises a combustion chamber opening 86 in the gasket interface surface 58. The pair of air inlet openings 91*a*, 91*b*, and the pair of exhaust outlet openings 92*a*, 92*b* are formed in the combustion chamber roof surface 90. For the avoidance of doubt, the internal surfaces of the air inlets 49*a*, 49*b*, and exhaust outlets 56*a*, 56*b* seen in FIG. 3 do not form part of the combustion chamber roof surface 90.

As discussed above, during the intake stroke of the piston 54, and during the early stages of the compression stroke of the piston 54, the air flow path tumbles as illustrated by the dotted line 59 in FIG. 2. As the piston 54 moves through the later stages of the compression stroke this tumble airflow pattern breaks down into a turbulent flow which helps to maximise combustion efficiency and flame front speed.

Figure 4:
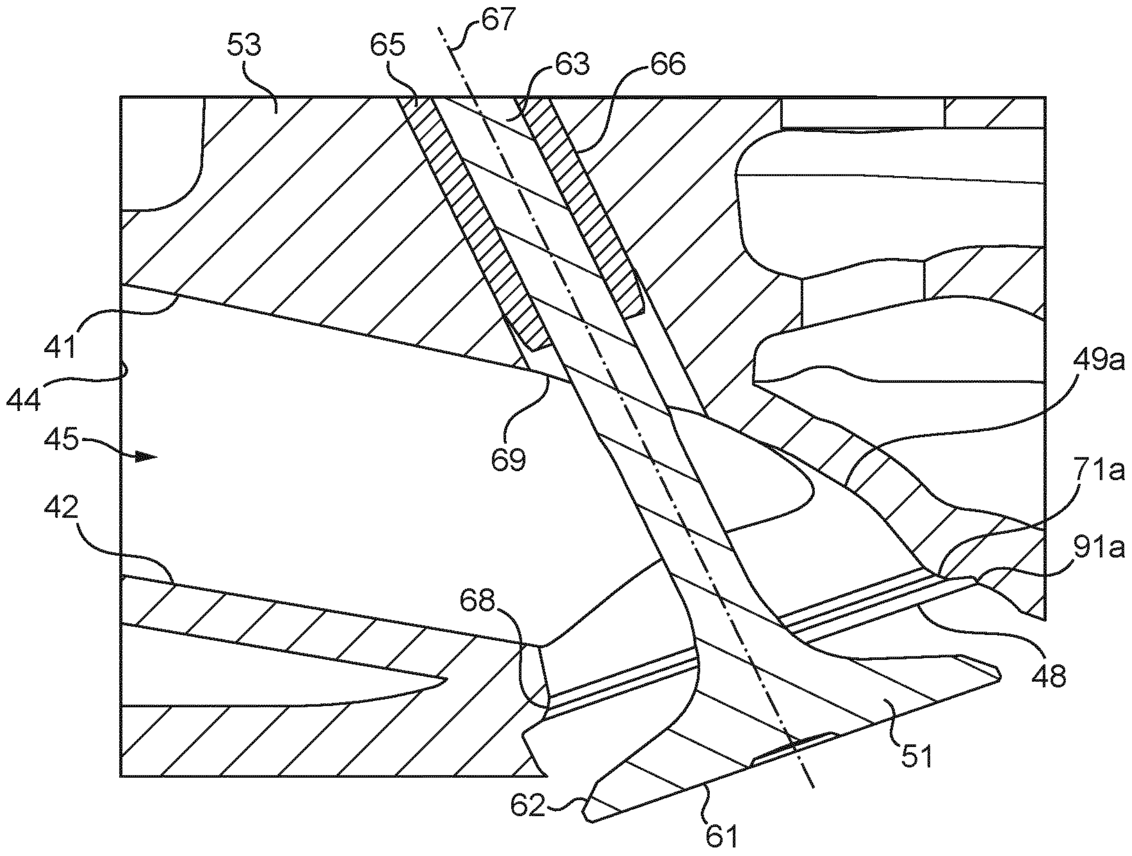
FIG. 4 shows the air intake port of FIGS. 2 and 3 in more detail.

FIG. 4 shows a close-up of the air inlet valve 51 of FIG. 2 in an open position. The air inlet valve 51 comprises a bottom surface 61 that faces the combustion chamber 50 and a tapered top surface 62, also referred to as a valve head top surface, that faces the air inlet passage 49*a*. The air inlet valve 51 is provided at the end of a valve stem 63 which is moveable within a valve guide insert 65 located within a valve guide passage 66 in the cylinder head 53. The valve guide passage is provided in a wall of the air channel opposite the top surface of the movable valve. The valve guide passage 66 extends into the wall and away from a valve guide opening 69 in the wall of the air channel. The valve guide passage 66 houses the valve guide 65 arranged to guide the valve stem 63 and permit movement of the movable valve between the closed state and an opened state. The valve guide insert 65 and the valve guide passage 66 share a common axis 67 along which the valve stem 63 moves in use. The inlet valve 51 is arranged to move by controlling the position of the valve stem 63. The inlet valve 51 may be moved between a closed state (FIG. 2) for closing off the combustion chamber inlet and an opened state (FIG. 4) wherein air can flow from the air inlet passage 49*a* into the combustion chamber 50.

The air inlet passage 49*a* extends into the cylinder head 53 away from the air inlet opening 91*a*. The portion of the air inlet passage 49*a* located proximate the air inlet opening 91*a* comprises an inlet throat 68. The inlet throat 68 comprises a tapered flat surface 71 which forms a seat for the top surface 62 of the inlet valve 51 such that when the inlet valve 51 is in the closed position, the tapered top surface 62 of the inlet valve 51 seats on the tapered flat surface 71 to seal the air inlet 49*a*. At least the flat surface 71 of the inlet throat 68 is radially symmetrical about the central axis 67 of the valve guide passage 66. The tapered flat surface 71 which forms the valve seat may be provided in a valve seat insert or may be machined directly into a wear resistant cladding which has been applied to the throat area 68 of the inlet passage 49*a* prior to machining of the flat valve seat surface 71.

Referring to FIG. 4, the air intake port comprises an air channel 45 defined between a top wall/ceiling 41 and a bottom wall/floor 42 (and side walls, not shown in FIG. 4). The air intake port comprises an air intake port inlet 44 and an air intake port outlet 48. The combustion chamber inlet is coterminous with the air intake port outlet. To achieve the tumble motion described above, it is beneficial to minimise disruption to the air flow into the combustion chamber as it passes through the air channel 45, particularly as it approaches the air inlet opening 91*a*. The valve guide 65 and the valve guide passage 66 are configured such that they minimise disruption to airflow through the air channel 45. Specifically, the valve guide 65 has a first end proximate the movable valve, the first end being positioned within the valve guide passage 66 such that airflow through the air channel 45 is not impeded by the valve guide 65. This non-impedance is achieved by providing that the valve guide 65 does not protrude into the air channel 45 (which would form an obstacle to disrupt airflow), and by providing that the valve guide 65 is not significantly recessed into the upper wall 41 of the air channel 45 (which would cause a large volume/cross section increase in the air channel 45 just before the valve, again disrupting airflow). Given the positioning of the valve guide 65 and valve guide passage 66 just before the entrance to the combustion chamber 50, such disruptions to airflow would have significant effects on the desired tumble motion shown in FIG. 2.

The valve guide 65 is positioned such that it extends to or proximate the opening in the upper wall 41 of the air channel 45, but does not protrude (or at least does not substantially protrude) into the air channel 45. That is, the valve guide 65 may be provided entirely within the valve guide passage 66 and thus outside of the air channel 45. While the valve guide 65 may be flush with the upper wall 41 of the air channel 45, it is acceptable for it to be set back slightly, for example due to manufacturing tolerances. For example, at least part of the first end of the valve guide 65 may be within less than 5 mm of the opening in the upper wall 41 of the air channel 45, but more preferably, within less than 1 mm of the opening in the upper wall 41 of the air channel 45. In some embodiments, at least part of the first end of the valve guide is substantially flush with the wall of the air channel. In this case, optionally the first end of the valve guide 65 is substantially flush with the wall of the air channel at all edges of the opening. It will be appreciated that this would require the first end of the valve guide 65 to be shaped with an angled end, in the case that the valve guide passage 66 is at a non-perpendicular angle with respect to the upper wall 41.

The opening can be seen to comprise a first edge distal from the air intake port outlet and a second edge proximal to the air intake port outlet. The air channel can be seen to comprise an upper wall having a substantially straight/flat portion (generally opposite to a substantially straight/flat floor of the air channel) which transitions to a curved portion, the curved portion curving towards the combustion chamber. The opening in the wall is provided in the upper wall at or near the transition from the straight portion to the curved portion. The first edge of the opening is on the substantially straight portion of the upper wall, whereas the second edge of the opening is at or near the transition.

Figure 5A:
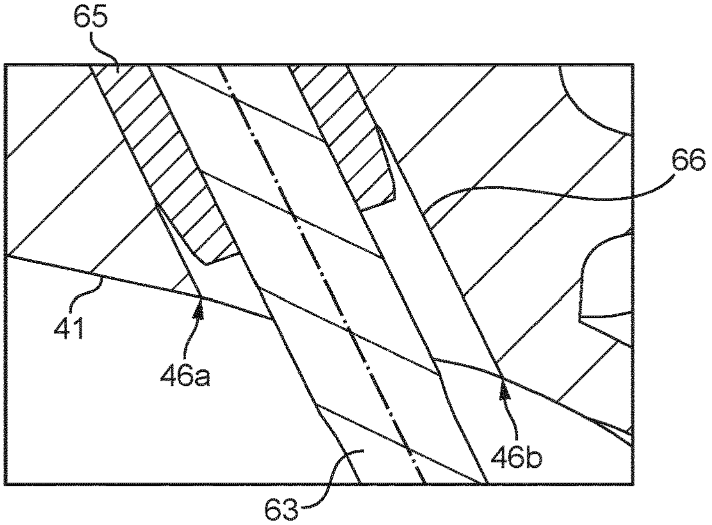
FIGS. 5A to 5C show a further magnified view of the valve guide passage and valve guide, and two variations thereof.

Referring to FIG. 5A, the valve guide 65 and passage 66 are shown in more detail. The valve guide passage 66 can be seen to have a substantially uniform diameter about its central axis inwardly of the passage from the first edge. The walls of the passage 66 about the valve guide 65 continue in the same direction beyond the valve guide 65 to the edges 46*a*, 46*b* of the opening. Because the valve guide passage 66 is at an acute angle to the upper wall 41 of the intake port channel 45, and because the valve guide 65 is cylindrical, the valve guide 65 extends closer to the air channel at a first edge 46*a* of the opening than at a second edge 46*b* of the opening. The first edge is distal from the air inlet 49*a*, while the second edge is proximal the air inlet 49*a*. If the valve guide passage 66 is perpendicular to the wall of the intake port channel, or if at least one end of the valve guide is angled, then the valve guide may instead be flush with, or at the same distance from, the upper wall 41 of the air channel 45 at all edges of the opening.

Due to the valve guide passage 66 being at an angle to the upper wall 41 of the intake port channel 45, the size and shape of the opening are not the same as the diameter of the valve guide passage itself (about its central axis). In particular, the opening will be an ellipse rather than a circle, and will have a minor axis which substantially matches the diameter of the valve guide passage, and a major axis (generally in the direction of airflow within the intake port channel) $O_d$ of:

$$O_d \approx O_p / \sin \alpha,$$

where $O_p$ is the diameter of the valve guide passage and a is the angle of the passage with respect to the upper wall 41 of the air channel 45.

The described geometry gives rise to a relatively small volume V of free space defined between the opening, the interior walls of the passage, and the valve guide (referred to generally herein as the valve guide cut-out/clearance). This volume may for example be less than or equal to $1e^{-6}$ $m^3$, and preferably less than $5e^{-7}$ $m^3$, and still more preferably less than or equal to $3.7e^{-7}$ $m^3$.

Figure 5B:
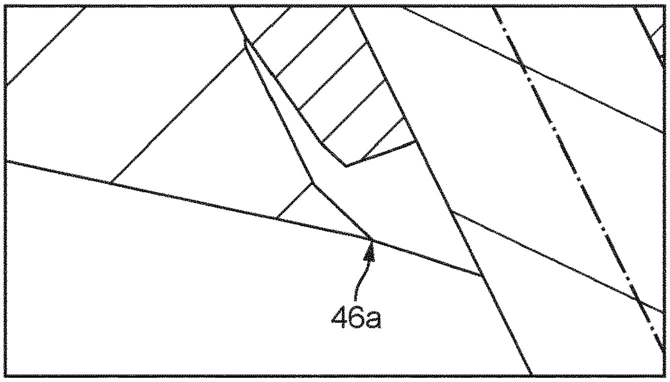
Figure 5C:
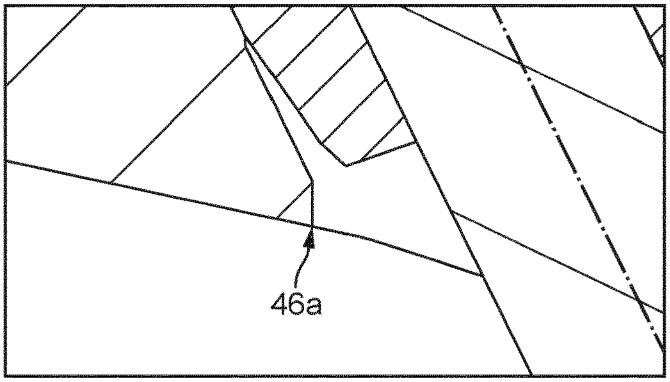

It can be seen from FIGS. 2, 4 and 5A to 5C that the first edge 46*a* distal from the air intake port outlet defines a sharp transition, at a first angle, between the upper wall 41 of the air intake port channel 45 and the passage wall of the valve guide passage 66. This sharp transition serves to detach the air flow from the valve guide opening 69 and thus reduce disturbances in the air flow past the valve guide opening 69 and valve guide 65. In general terms, the valve guide passage 65 may be inclined at a second angle with respect to the air channel, with the second angle being either the same or different to the first angle. Usually, the first and second angles will be substantially the same, representing the case where the walls of the passage continue to the upper wall 41 without narrowing or widening at the opening. This is the case shown in FIGS. 2, 4 and 5A. That is, a single angled transition is provided from the upper wall of the air intake port to the passage wall of the valve guide passage. This geometry is the simplest to machine, and ties the sharpness of the transition to the angle of the passage with respect to the air channel. In alternative arrangements, the first and second angles may be different. Two examples of such are shown in FIG. 5B and FIG. 5C. In FIG. 5B, the first angle is smaller than the second angle. This provides for a sharper transition at the first edge 46*a* than would be provided in the case of a valve guide passage 66 which is at a larger angle with respect to the air intake port channel 45. In contrast, in FIG. 5B the first angle is larger than the second angle. This provides for a less sharp transition, but may be beneficial in the case where the second angle of the valve guide passage with respect to the air intake port channel is sufficiently acute that the first edge 46*a* would be too sharp/thin and fragile to be formed by machining, or to survive ongoing use.

In any of these cases, the sharp corner 46*a* in the direction of flow in the roof 41 of the channel 45 minimises reverse flow into the valve guide cut out (empty portion of passage, where the valve guide does not extend to the opening). It will be appreciated that in the case of a valve guide which is entirely flush with the opening, there will be no valve guide cut out/clearance into which reverse flow could occur, and no corner.

While the present technique utilises a sharp edge/transition at corner 46*a* to achieve the desired effects, some degree of roundedness may be permitted without losing these benefits. It is therefore envisaged that the first edge may thus have a radius of curvature of between zero and 3 mm, and preferably between zero and 1 mm. Preferably though, the first edge is formed (for example using the cutting techniques described subsequently) without actively adding a rounded corner at the first edge.

The first angle is preferably acute. The first angle may for example be between 60° and 0°. Preferably the first angle is greater than 15°. Still more preferably, the first angle is between 20° and 30°. Generally, the more acute the angle, the more detached the air flow, and the less reverse flow will occur into the valve guide cut-out/clearance. It will however be appreciated that very small angles may not be possible due to manufacturing limitations, structural integrity and other operational reasons.

Referring to FIGS. 6A to 6F, a manufacturing method for forming a cylinder head of an engine, and in particular for forming the valve guide and valve guide passage, as described above, is schematically illustrated.

Figure 6A:
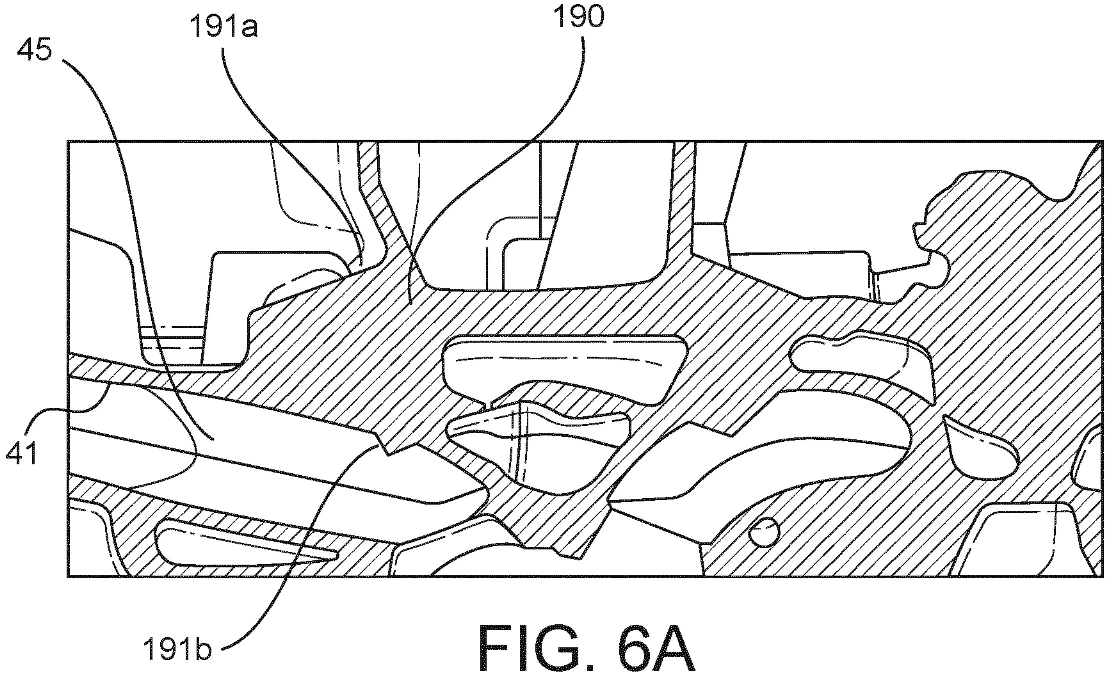
FIGS. 6A to 6F show a series of manufacturing steps for forming an engine in accordance with the invention.

As shown in FIG. 6A, a cast part 190 of the cylinder head is provided at a first step. In the cast part, a portion of the upper wall 41 of the air channel 45 at which the opening to the valve guide passage is to be formed is provided with a cast formation 191*b* which extends into the air channel 45. That is, where the valve guide passage opening is to be formed, the upper wall 41 of the air channel 45 in the cast part has a formation which protrudes into the air channel 45. The formation 191*b* has a target surface substantially or generally perpendicular to an intended orientation (angle with respect to the air channel) of the valve guide passage.

Figure 6B:
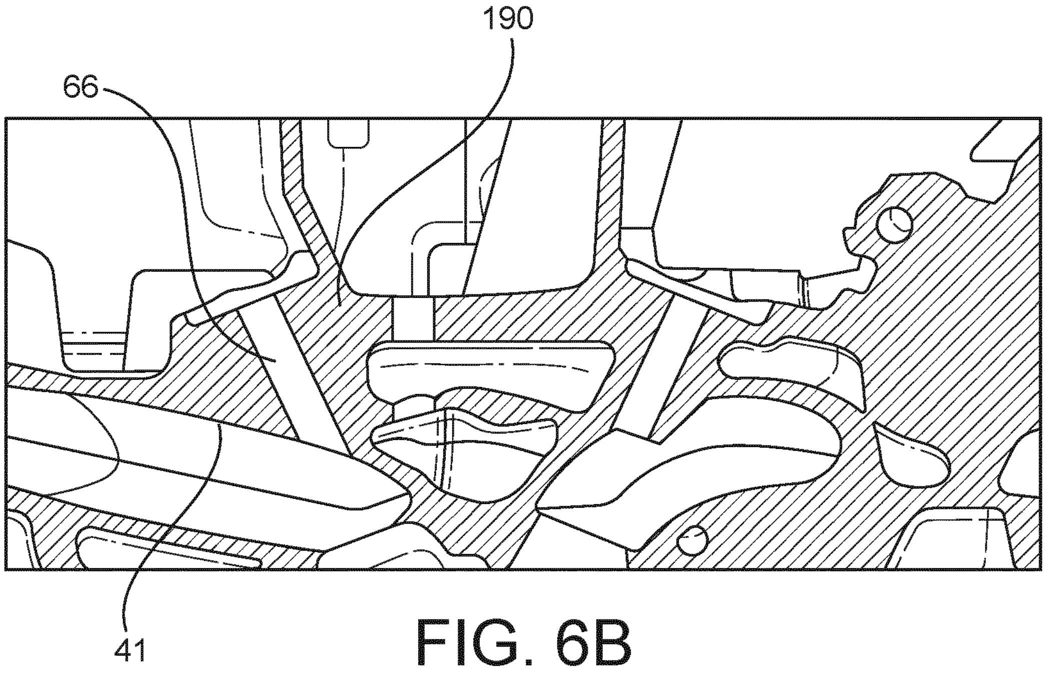

As can be seen in FIG. 6B, a first cut of the valve guide passage 66 is then carried out at a second step. In particular, starting at the target surface, a drill or other cutting tool is used to cut away the formation, and into the wall of the air channel, to form the valve guide opening and the valve guide passage. Since the target surface is perpendicular to the intended orientation of the valve guide passage, and thus to the cutting direction of the cutting tool, the cutting tool is less likely to deviate from its intended cutting axis than would be the case if it were to attempt to cut at an acute angle against a wall of the air channel. This improves the accuracy in the positioning of the valve guide passage, the quality of the cut, and reduces the likelihood of tool breakage due to shear forces. It will be appreciated that the desired orientation of the valve guide passage is on a cutting axis which passes through the mouth of the air intake port—permitting the cutting tool access via the mouth. It is apparent from FIG. 6B that the protruding formation in the original cast part 190 has been completely removed by the second step.

In an alternative embodiment, referring to FIG. 6A the cast part is not provided with a formation 191*b* extending into the air channel, and instead the upper wall of the air channel is continuous in this region. In this case, the passage cut to form the valve guide passage 66 shown in FIG. 6B is cut from above (as shown in FIG. 6B), that is from a side of the cast part opposite to the air intake port, and air inlet. In order that the cut be accurate and the cutting tool not wander on first contact with the cast part 190, a formation 191*a* is used, having a target surface substantially perpendicular to the direction of the cut.

Figure 6C:
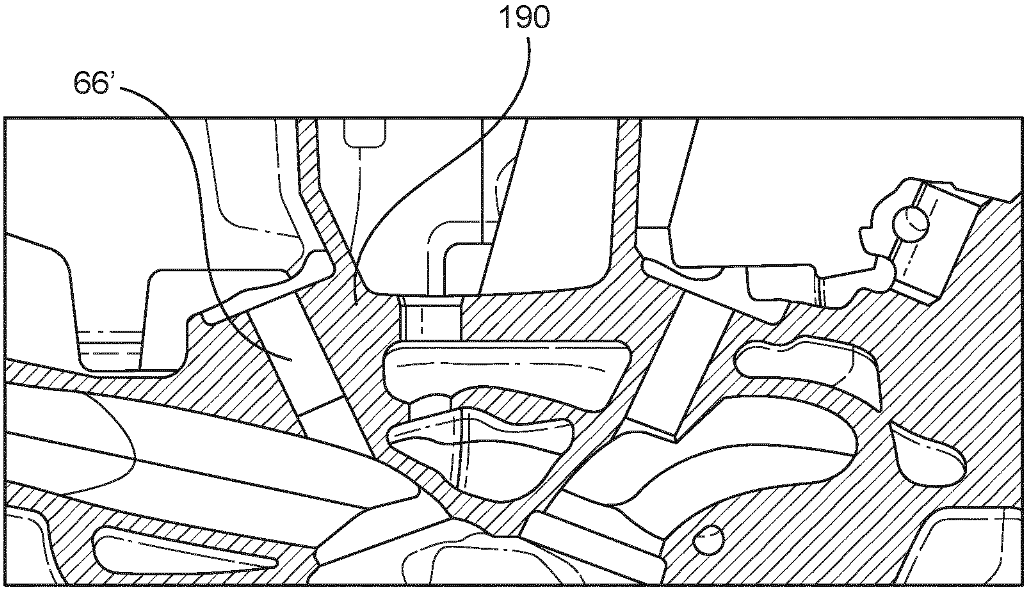

In FIG. 6C, the passage cut in FIG. 6B is widened out by a further cutting process at a third step. Since an existing bore is present (irrespective of which direction it has been cut from), a reamer may be used for this further cutting process, to widen out and tidy up the passage. Comparison of FIGS. 6B and 6C reveals the diameter of the valve guide passage in FIG. 6C is greater than in FIG. 6B. In addition to providing a wider passage, this second cut cleans up (smoothes) the interior of the passage, ready to receive the valve guide.

Figure 6D:
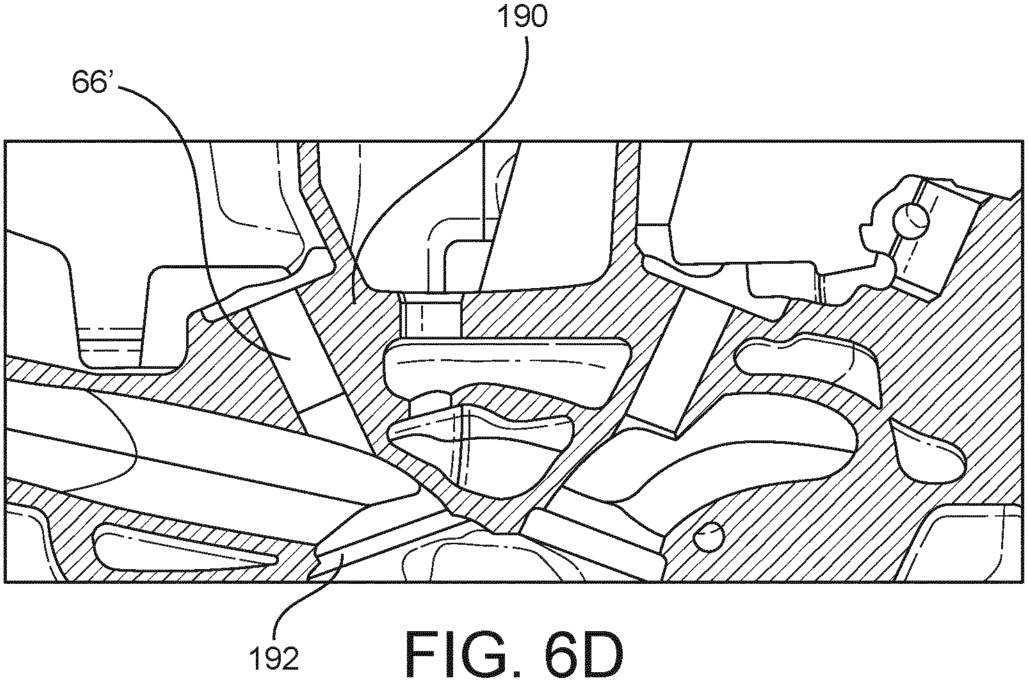

In FIG. 6D, a cladding 192 is added to the mouth of the air inlet, generally in the form of a bead of weld at a fourth step. The cladding 192 provides the valve seat for the intake valve.

Figure 6E:
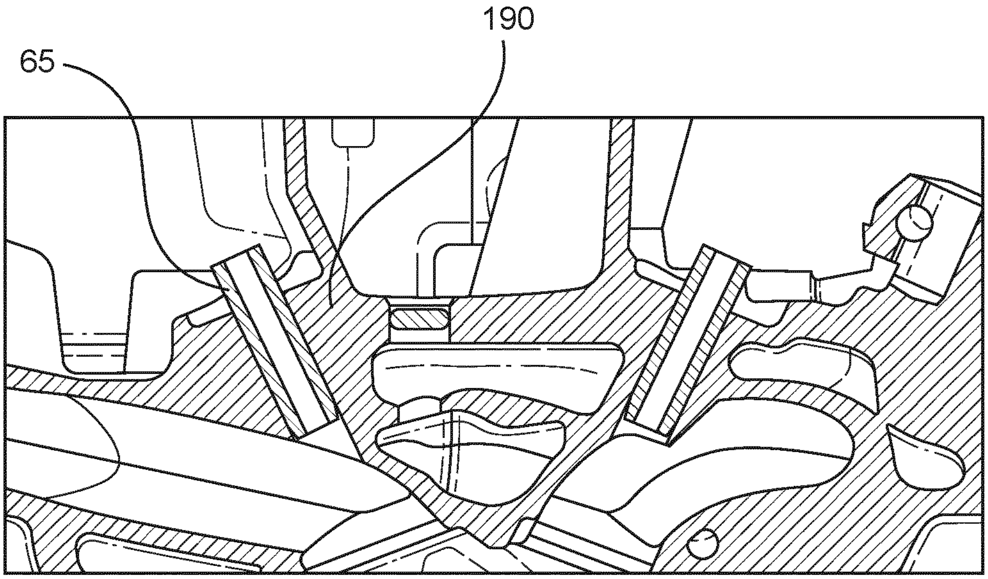

In FIG. 6E, the valve guide 65, which may be of stainless steel, is inserted (pressed) into the valve guide passage 66 formed in the above steps, at a fifth step. The inserted valve guide 66 is generally cylindrical, with a predrilled pilot hole extending through it (or at least part way through it) at its longitudinal axis. In the present example, the valve guide passage extends entirely through the cylinder head, and so the valve guide may be inserted from either direction. The valve guide 65 is dimensioned to provide a tight fit within the valve guide passage 66, and thus may need to be forcibly urged into place within the valve guide passage. As shown in FIGS. 2, 4, 5A to 5C and 6E and 6F, one end of the valve guide is provided with a sloped or chamfered exterior surface to aid its insertion into the valve guide passage. The chamfered end is located proximate the intake port channel once the valve guide is fully inserted into the valve guide passage.

Figure 6F:
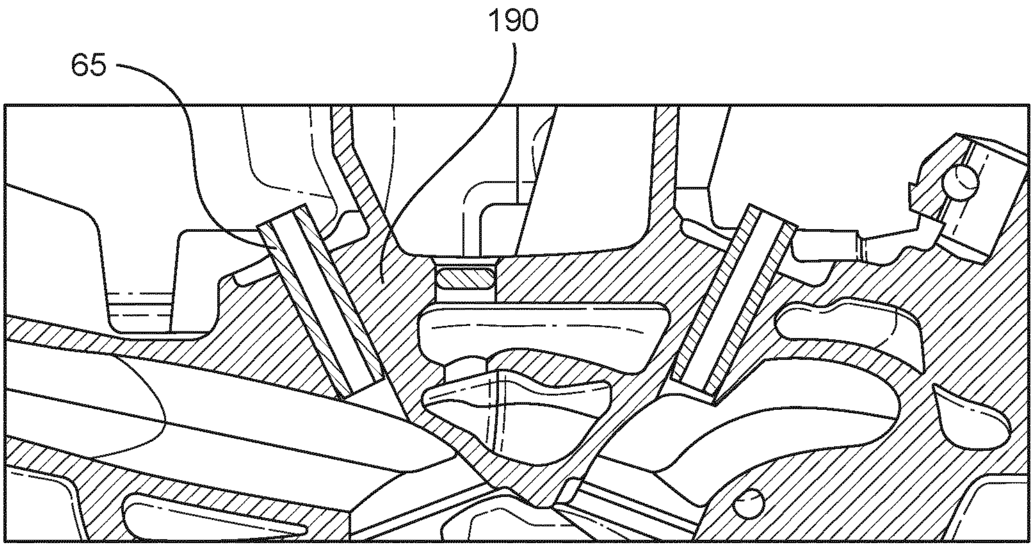

In FIG. 6F, a further machining step is carried out at a sixth step while the valve guide is in situ within the valve guide passage. The further machining step cuts a desired diameter hole/through bore about the pilot hole in the valve guide. As a result of the final bore through the valve guide being cut while the valve guide is in situ within the valve guide passage, the alignment of the bore (which will subsequently receive the stem of the valve, as per FIGS. 2 and 4) with respect to the valve seat (via which the cut is made) can be more accurately achieved, while permitting the original manufacturing of the valve guide (with only a pilot bore) to be carried out with less stringent manufacturing tolerances, reducing cost.

In carrying out the above steps, the channel is machined at the second and third steps, the guide inserted with a pilot hole in it at a fifth step, and then the final machining of the valve seat and the inner diameter of the valve guide are carried out at the final, sixth, step with the same tool, and from the inside (through valve mouth) so that the valve guide inner and the valve seat are concentric. This in turn reduces any valve seat wear from the valves landing off centre and being dragged back into the seat during use.

In addition to the improved airflow characteristics achieved by both the positioning of the valve guide within the valve guide passage, and the sharp angle transition of the valve guide passage from the intake port channel, these features additionally result in reduced opportunities for material (such as fuel or debris) to travel back from the combustion chamber (due to the undisturbed airflow) and fewer recesses into which such fuel or debris can become trapped. Due to the undisturbed air flow, any material carried out from the combustion chamber may be carried back in by the airflow in the next intake cycle, since the fuel or debris cannot readily become trapped where the airflow cannot dislodge it.

Generally, the features described in relation to the intake are not necessarily applied on the outlet side. This is because the flow characteristics on the outlet are not relevant to defining the tumble motion desired in the present application.

It will be appreciated that various changes and modifications can be made to the present invention without departing from the scope of the present application.

The invention claimed is:

1. A lean-burn gasoline engine comprising:

an air intake port having an air intake port inlet, an air intake port outlet, and an air channel connecting the air intake port inlet to the air intake port outlet;

a combustion chamber having a combustion chamber inlet being connected to the air intake port outlet, the combustion chamber inlet having a throat where the air intake port outlet meets the combustion chamber inlet;

a movable valve comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber;

a valve guide opening in a wall of the air channel opposite the top surface of the movable valve; and a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide;

wherein a volume V of free space defined between the opening, the interior walls of the passage, and the valve guide is less than or equal to $1e^{-6}$ $m^3$.

2. A lean-burn gasoline engine according to claim 1, wherein at least part of the first end of the valve guide is within less than 5 mm of the opening in the wall of the air channel, preferably at least part of the first end of the valve guide is within less than 1 mm of the opening in the wall of the air channel.

3. A lean-burn gasoline engine according to claim 2, wherein at least part of the first end of the valve guide is substantially flush with the wall of the air channel, and optionally wherein the first end of the valve guide is substantially flush with the wall of the air channel at all edges of the opening.

4. A lean-burn gasoline engine comprising:

an air intake port having an air intake port inlet, an air intake port outlet, and an air channel connecting the air intake port inlet to the air intake port outlet;

a combustion chamber having a combustion chamber inlet being connected to the air intake port outlet, the combustion chamber inlet having a throat where the air intake port outlet meets the combustion chamber inlet;

a movable valve comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber;

a valve guide opening in a wall of the air channel opposite the top surface of the movable valve; and a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide;

wherein the opening comprises a first edge distal from the air intake port outlet and a second edge proximal to the air intake port outlet;

wherein the first edge of the opening defines a sharp transition, at a first angle, between the wall of the air channel within which the opening is provided, and a wall of the valve guide passage; and wherein the first edge has a radius of curvature of between zero and 3 mm.

5. A lean-burn gasoline engine according to claim 1, wherein the air channel comprises an upper wall having a substantially straight portion which transitions to a curved portion, the curved portion curving towards the combustion chamber, wherein the opening in the wall is provided in the upper wall at or near the transition.

6. A lean-burn gasoline engine according to claim 4, wherein the first edge of the opening is on the substantially straight portion of the upper wall.

7. A lean-burn gasoline engine according to claim 5, wherein the second edge of the opening is at or near the transition, and optionally the second edge of the opening is on the substantially straight portion of the upper wall.

8. A lean-burn gasoline engine according to claim 4, wherein the valve guide passage has a substantially uniform diameter about its central axis inwardly of the passage from the first edge.

9. A lean-burn gasoline engine according to claim 1, wherein the walls of the passage about the valve guide continue in the same direction beyond the valve guide to the edges of the opening.

10. A lean-burn gasoline engine according to claim 4, wherein the valve guide extends closer to the air channel at the first edge of the opening than at the second edge of the opening.

11. A lean-burn gasoline engine according to claim 1, wherein the opening is elliptical and has a major axis $O_d$ of:

$$O_d \approx O_p / \text{Sin}\ \alpha,$$

where $O_p$ is the diameter of the valve guide passage and a is the angle of the passage with respect to the wall of the air channel.

12. A lean-burn gasoline engine according to claim 1, wherein the volume V is preferably less than $5e^{-7}$ $m^3$, and still more preferably less than or equal to $3.7e^{-7}$ $m^3$.

13. A lean-burn gasoline engine according to claim 4, wherein the valve guide passage is inclined at a second angle with respect to the air channel, wherein the first angle and the second angle are substantially the same.

14. A lean-burn gasoline engine according to claim 4, wherein the first edge has a radius of curvature of between zero and 1 mm.

15. A lean-burn gasoline engine according to claim 13, wherein the first angle is acute, preferably the first angle is less than 60°, preferably greater than 15°, and more preferably between 20° and 30°.

16. A vehicle comprising a lean-burn gasoline engine according to claim 1.

17. A method of manufacturing a lean-burn gasoline engine, the engine comprising an air intake port having an air intake port inlet, an air intake port outlet, and an air channel connecting the air intake port inlet to the air intake port outlet, and a combustion chamber having a combustion chamber inlet being connected to the air intake port outlet, the combustion chamber inlet having a throat where the air intake port outlet meets the combustion chamber inlet, a movable valve comprising a valve head bottom surface that faces the combustion chamber, a valve head top surface that faces the air intake port and a valve stem, the movable valve being arranged to move between a closed state for closing off the combustion chamber inlet and an opened state wherein intake air can flow from the air intake port into the combustion chamber, a valve guide opening in a wall of the air channel opposite the top surface of the movable valve, and a valve guide passage extending into the wall and away from the valve guide opening, the valve guide passage housing a valve guide arranged to guide the valve stem and permit movement of the movable valve between the closed state and an opened state, the valve guide having a first end proximate the movable valve, the first end being positioned within the valve guide passage such that airflow through the air channel is not impeded by the valve guide, the method comprising:

providing a cast part; and cutting through the wall of the air channel, to form the valve guide opening and the valve guide passage;

wherein a portion of the wall of the air channel at which the opening is to be formed is provided with a cast formation which extends into the air channel, the formation having a target surface substantially or generally perpendicular to an intended orientation of the valve guide passage starting at the target surface, wherein the cutting step comprises:

a first cutting step, starting at the target surface, cutting away the formation, and forming the valve guide passage.

18. A method of manufacturing according to claim 17, wherein the cutting step comprises a first cutting step carried out from a side of the cast part away from the air channel and towards the air channel, the first cutting step forming a first cut of the valve guide passage, followed by a second cutting step carried out through the throat and the air channel and into the first cut, which forms a second cut of the valve guide passage.

19. A method of manufacturing an engine according to claim 17, wherein the cutting step comprises a second cutting step, carried out through the throat and the air channel and into the first cut made by the first cutting step, which forms a second cut of the valve guide passage.

* * * * *